United States Patent [19]

Pfister

[11] 4,015,487
[45] Apr. 5, 1977

[54] INDEX MECHANISM

[75] Inventor: Stanley Arthur Pfister, Wilmington, Ohio

[73] Assignee: Cincinnati Milacron, Inc., Cincinnati, Ohio

[22] Filed: Feb. 23, 1976

[21] Appl. No.: 660,399

[52] U.S. Cl. .............................. 74/813 L; 74/826
[51] Int. Cl.[2] ........................................ B23B 29/32
[58] Field of Search ................ 74/813 L, 824, 826

[56] References Cited

UNITED STATES PATENTS

| | | | |
|---|---|---|---|
| 3,618,426 | 11/1971 | Fisher | 74/824 |
| 3,718,055 | 2/1973 | Maier | 74/813 L X |
| 3,797,333 | 3/1974 | Maier | 74/813 L X |

*Primary Examiner*—Allan D. Herrmann
*Attorney, Agent, or Firm*—Thomas M. Farrell

[57] ABSTRACT

A unique index mechanism for positioning an indexable machine tool member wherein a first toothed coupling is fixed to a machine tool base member, and a second relatively movable, toothed coupling having a uniformly spaced number of teeth unequal to the first uniformly spaced coupling teeth is located concentric to the first coupling on the machine tool base. The indexable machine tool member is carried by the second movable coupling, and a third toothed coupling with teeth disposed toward the first and second couplings is rotatably mounted to the machine tool in such fashion that the third coupling may be powered into and out of meshing engagement with the first and second couplings.

The second coupling which carries the indexable machine tool member may be indexed to discrete angular increments corresponding to the angular difference in the tooth spacing of the respective first and second couplings. Means are provided for indexing the second coupling and means are provided to drive the third coupling at a predetermined speed ratio relative to the second coupling so that the third coupling may be rotatably advanced to a correct angular position to reassume meshing engagement.

2 Claims, 8 Drawing Figures

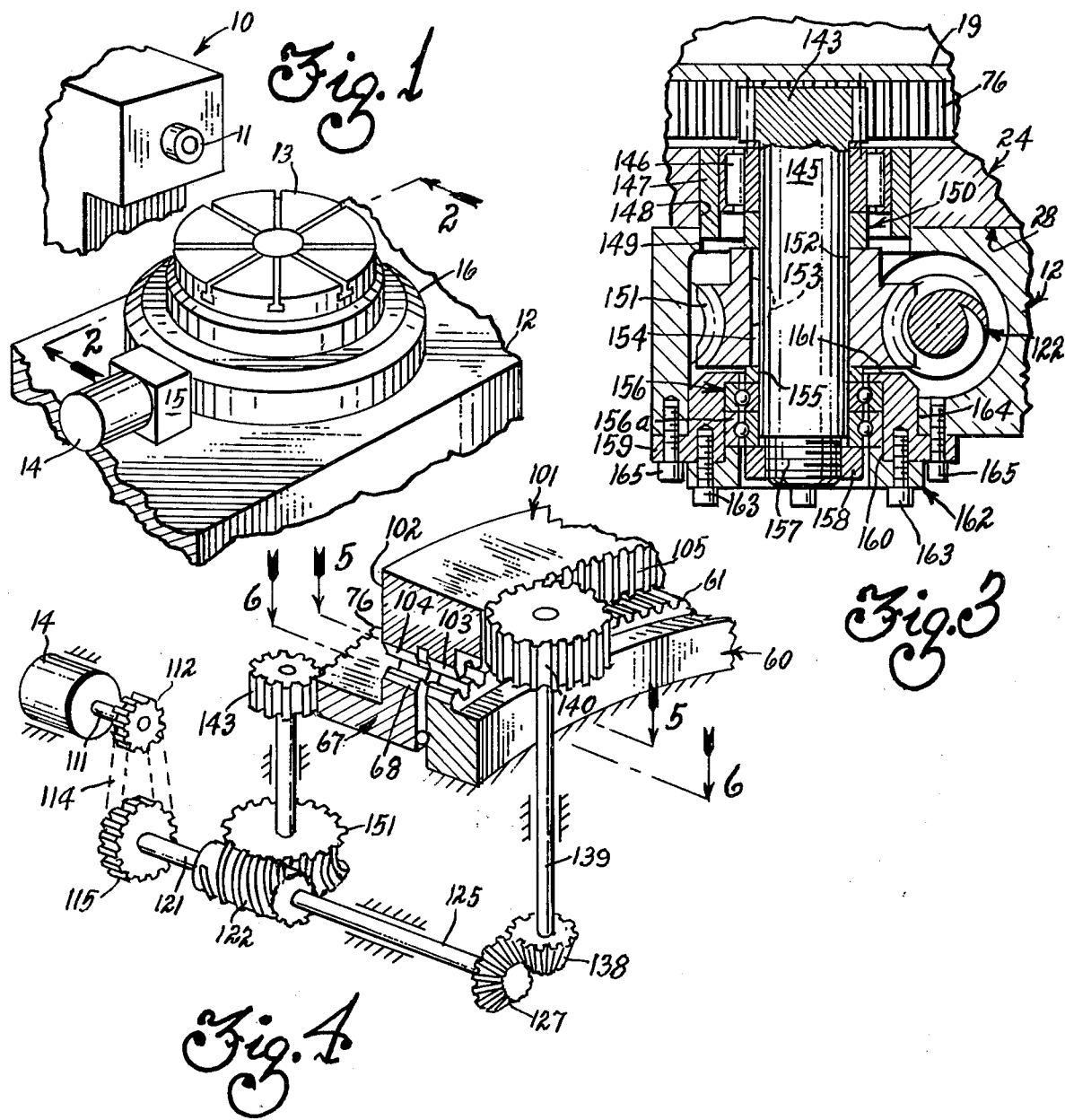

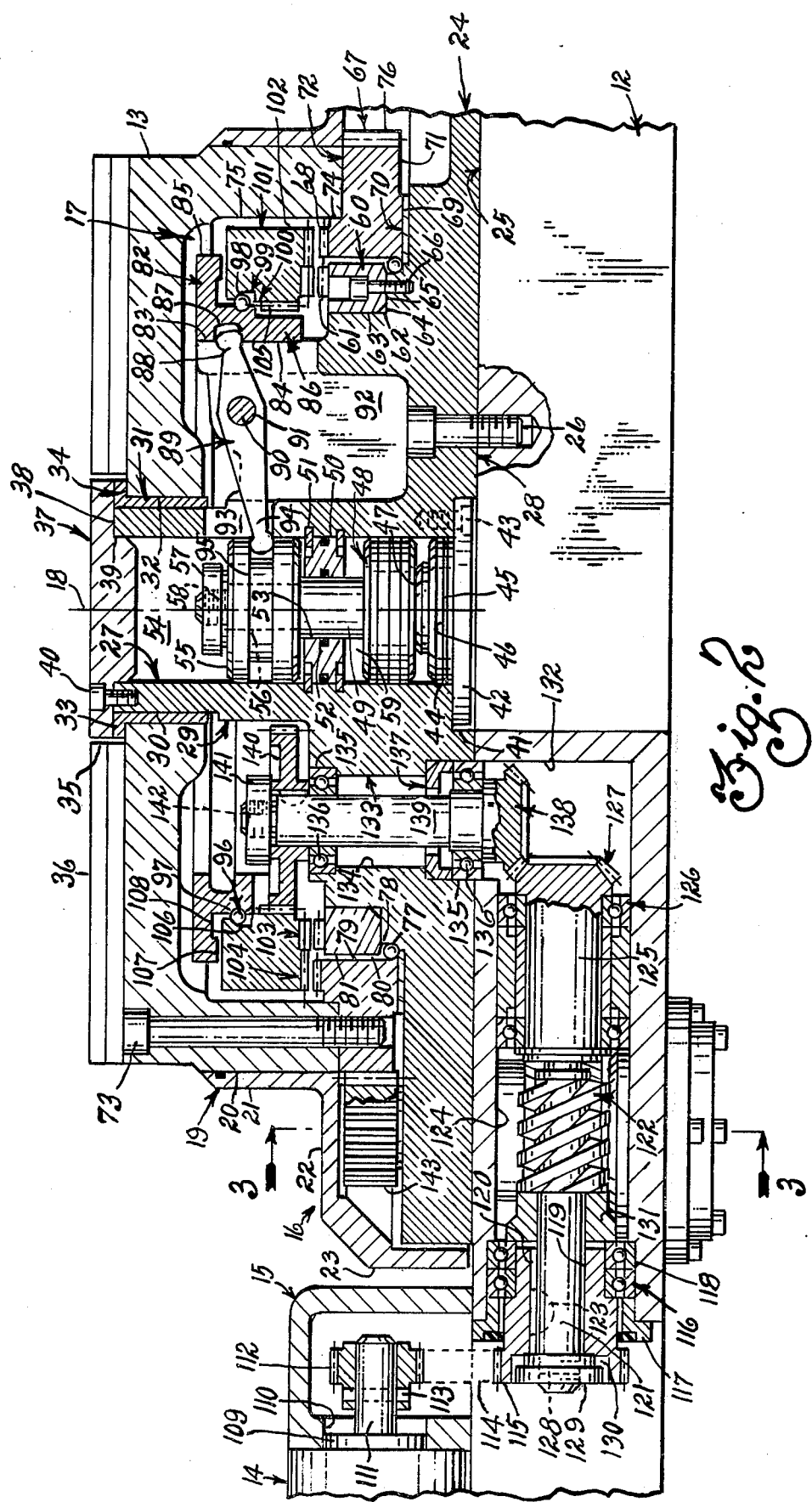

INDEX MECHANISM

BACKGROUND OF THE INVENTION

In machine tools, it is often necessary to provide precision indexing of a machine tool member. For example, in lathes, it often necessary to index a tool turret to discrete angular positions to present a new tool to the workpiece. Similarly, it is often necessary to provide indexing movement to a machine table, such as the rotary table on a milling machine, to present additional surfaces to the machine tool spindle when it is desired to machine these surfaces.

One common design of machine tool indexing mechanism simply utilizes two toothed coupling halves essentially consisting of two ring members having facial teeth disposed toward one another so that the two may be enmeshed to carry the indexable machine tool member relative to a fixed machine tool member. One very common such toothed coupling arragement is produced on machines generating a Curvic tooth form, (Registered Trademark of Gleason Works) which is well-known in the art. Many other tooth forms may be employed as well to obtain the degree of precision registration necessary in the coupling.

A common problem exists with the use of two multitooth coupling halves, which may readily be seen in that the coupling can be indexed only to increments which are multiples of the tooth spacing. For example, when using a 72 tooth coupling, having tooth spacing of 5°, one is limited to discrete index increments of 5° or multiples thereof. A second problem exists in the use of a two-part coupling arrangement as described, in that axial movement must be provided to the one coupling half to separate the coupling prior to index. This requirement of separable coupling halves can be disadvantageous when one of the coupling halves supports a heavy machine member and thus requires great lifting power. Further, it is sometimes possible on movable machine tool members for chips to pack up between the relatively movable members.

A novel improvement in the area of toothed index coupling mechanisms is shown and described in U.S. Pat. No. 3,618,426, of Fisher, wherein three locating and locking elements are employed in the index mechanism. In the Fisher patent, a first coupling half having facial teeth is secured to a machine slide, and a second relatively movable coupling half having facial teeth, is mounted concentric to the fixed coupling half and rotatably movable relative thereto. The angularly movable coupling half carries an indexable machine member to discrete angular increments when indexed, and a third coupling half having facial teeth disposed towards the first and second coupling members, is moved into and out of meshing engagement with the fixed and rotatable coupling elements when indexing is desired. By this manner of design therefore, the indexable machine tool member need not have any axial movement relative to the fixed coupling half, since the third coupling element acts as a keying means and it alone is moved in an axial fashion relative to the fixed and rotatable coupling halves.

A similar impediment exists in the Fisher patent, as in the two-part index couplings, in that the indexable machine element and its associated coupling can only be moved to discrete angular increments corresponding to a whole tooth space on the fixed coupling element.

Applicant has obviated the difficulties inherent in the prior art devices by his novel design which employs coupling elements which permit fine resolution indexing of a machine tool member to descrete angular increments corresponding to a difference in tooth spacing of the relatively fixed and movable coupling elements.

It is therefore an object of the present invention to provide an indexing mechanism capable of fine resolution indexing of a machine tool member without axial movement of the member.

SUMMARY OF THE INVENTION

The invention herein contained, comprises an indexing mechanism of the type having a first locking and locating element, which is a ring having a facial array of teeth, fixed to a machine base member. A second relatively rotatable coupling element having a similar, but, unequal plurality of facial teeth, is disposed concentric to the first coupling element, and carries an indexable machine tool member. A third coupling element having first and second tooth portions corresponding in number to the first and second coupling elements, respectively, is mounted with its teeth disposed towards the facial teeth of the first and second coupling element, and is coaxial with said first and second coupling elements.

Means is provided to index the second coupling element and its indexable machine tool member at minimum angular displacements corresponding to the angular difference in the tooth spacing of the first and second coupling elements. Means is also provided to rotatably power the third coupling element at a predetermined ratio to the indexable machine tool member movement, so that as the second coupling element is incrementally advanced in a rotatable direction relative to the fixed first coupling element, the third locking and locating coupling element will be advanced to such position where the first and second tooth portions may reassume engagement with the first and second coupling elements.

Means is provided to move the third coupling element into and out of meshing engagement with the first and second coupling elements.

BRIEF DESCRIPTION OF THE DRAWINGS

FIG. 1 is a perspective view of a machine tool having a spindle, machine basemember, and indexable machine tool member.

FIG. 2 is a section through the indexable machine tool member taken along the line 2—2 of FIG. 1.

FIG. 3 is an elevational section through power drive elements of FIG. 2, taken along the line 3—3 of FIG. 2.

FIG. 4 is a diagramatic prespective view of an indexing mechanism.

DESCRIPTION OF THE PREFERRED EMBODIMENT

Figure 5A:
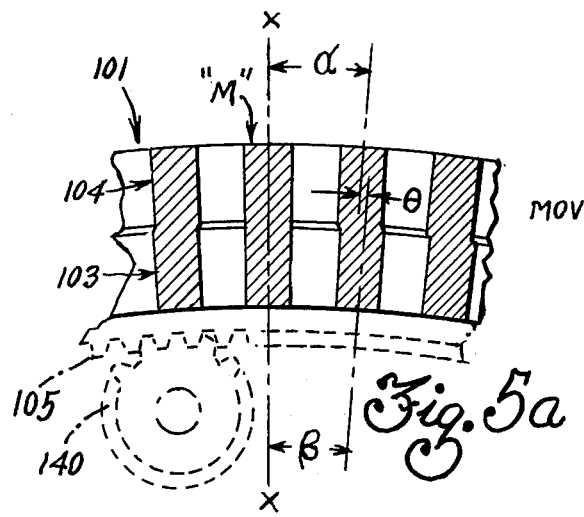
FIG. 5a is a plan section through coupling elements taken along the line 5—5 of FIG. 4.

Referring now to the drawings and particularly to FIG. 1 thereof, there is depicted a machine tool 10 having a machine tool spindle 11, and an associated machine tool base member 12. The base member 12 has mounted thereon an indexable machine tool member 13, in this case comprising a rotary table. An indexing prime mover such as a motor 14 is mounted to a motor support 15 which is adjacent to the housing 16 containing the index mechanism 17.

FIG. 2 depicts a section through the indexable machine tool member 13, illustrating support and index mechanism 17 associated therewith. The rotatable machine element 13, in this case a rotary table, is adapted to rotate about a central axis 18, and a shroud 19 is carried on a smooth fitting diameter 20 of the table 13, to provide an enclose or housing 16, for the indexing mechanism 17. The shroud 19 has a first diameter portion 21 extending down the diameter 20 of the rotary table 13 and terminating in a flange portion 22 which extends the radial dimension of the shroud 19 out to a point where a cylindrical section 23 is drawn down around the indexing mechanism 17. In this way, the shroud 19 prevents the entrance of contaminents, such as dust and chips, from entering into the indexing mechanism 17. The machine tool base member 12 carries the mechanism housing 24, which is bolted to a surface 25 of the base member 12 by screws 26. The mechanism housing 24 has a central bore 27 coaxial with the axis 18 of the rotary table 13. The bore 27 extends from the bottom 28 of the housing 24 up through a cylindrical section 29 of the housing 24 and the cylindrical section 29 of the housing 24 has a smooth pilot diameter 30 turned about its circumference where a bearing sleeve 31 is located which rides smoothly on the pilot diameter 30 of the housing 24 and the sleeve 31 is also close-fitting within a concentric bore 32 in 'the rotary table 13. The sleeve 32 has a flange 33 on its uppermost end which seats in the bottom 34 of a counterbored hole 35 extending down into the topmost surface 36 of the rotary table 13. A cap 37, which bears on the topmost face 38 of the cylindrical housing portion 30 and has a pilot diameter 39 extending into the bore 27 of the housing 24, is retained in position therewith by screws 40 so that the sleeve 31 and table 13 are prevented from moving upward axially relative to the housing 24, yet the cap 37 permits relative rotation to occur between the housing 24 and the rotary table 13.

The bottom surface 28 of the housing 24 is provided with a counerbored hole 41 within which is secured a cylinder cap 42, retained by screws 43, and a pilot diameter 44 of the cylinder cap 42 extends into and is in close-fitting relationship with the central bore 27 of the housing 24. A fluid seal is formed by an O-ring 45 located in a groove 46 around the close-fitting pilot diameter 44 of the cap 42. At the innermost end of the cap, a smaller diameter portion forms a short stop shoulder 47 for the resting surface of a piston 48.

The piston 48 is free to move in close fitting relationship with the bore 27, and the piston 48 is comprised of a short cylindrical segment having a piston rod 49 at its topmost end, extending through a stop shoulder 50 which is retained at an intermediate position in the bore 27 by snap rings 51. The piston rod 49 extends through a seal 52 in the smooth-fitting bore 53 of the stop shoulder 50 and upward to a non-fluid area 54. A yoke ring 55 is received on a small pilot 56 of the uppermost end of the piston rod 49 of the piston and the yoke ring 55 is fixed to the piston shaft 49 by a nut 57 received on threads 58 on the end of the piston rod 49. Thus, when the piston 48 is powered up and down in its fluid cavity 59, the yoke ring 55 will be powered up and down as well.

The index mechanism housing 24 has a first coupling element 60 which is concentric to the central axis 18. A first annular array of teeth 62 is provided on the first coupling element 60, yielding an upwardly-oriented coupling element 60 having facial teeth 61. A cylindrical portion 62 is machined on the housing 24 to locate the smooth inner bore 63 of the first coupling element 60 and a shoulder portion 64 is provided, against which the bottom surface 65 of the coupling element 60 rests and the element 60 is secured from relative rotation with the housing 24 by screws 66.

A second coupling element 67 having a second annular array of teeth 68 is concentrically disposed around the first coupling element 60. The second coupling element 67 has an array of upwardly-oriented facial teeth 68 which are uniformly spaced but unequal in number to the first array of teeth 61. The second coupling element 67 is supported on its lower face 69 on a bearing pad 70 which is secured to the index housing 24. A flange portion 71 of the second coupling element 67 carries the indexable machine trace 13 on its uppermost face 72 and secures the table 13 with screws 73 so that the second coupling element 67 and rotaty table 13 move in unison. A pilot diameter 74 is provided adjacent to the upper flange face 72 of the coupling element 67, to center the rotatable machine table 13 on its respective guide bore 75. An external gear 76 is machined on the outer circumference of the second coupling element 67.

A plurality of balls 77b are carried in a circular recess 78 about the index housing 24 and the balls 77 are trapped below the first coupling element 60. A bore 79 is provided through the second coupling element 67 and a clearance 80 is maintained between the second coupling bore 79 and the outer diamter 81 of the first coupling element 60, while the balls 77 are selected to be of such size that the balls 77 will bear on the diametral index housing recess 78 and the bore 79 of the second coupling element 67.

A clamp ring 82, which is movable in an axial direction on the index housing 24, is carried on a support diameter 83 which is machined on the housing 24, which bears smoothly within the through-bore 84 of the clamp ring 82. The ring 82 has a flange portion 85 at its topmost end adjacent to its main body 86. An annular groove 87 is provided within the bore 84 of the clamp ring 82, within which is located the outer end 88 of a clamp lever 89. The clamp lever 89 is pivotable about a pivot pin 90 which is relatively fixed with respect to the housing 24, and the pin 90 extends through a bore 91 in the clamp lever 89. The lever 89 extends from the annular groove 87 of the clamp rinfg 82 through a recess 92 in the housing 24 and through an opening 93 in the wall of the cylindrical section 29 of the housing 24, where the inboard end 94 of the clamp lever 89 is in close fitting contact with the circumferential groove 95 of the yoke ring 55. Thus, it can be seen that as the yoke ring 55 is powered up by the piston 48, the clamp ring 82 will be powered down and vice-versa. The clamp ring 82 has a complement of balls 96 carried in a groove 97 about its mean body 86, and the balls 96 in turn are in communication with a ramp surface 98 of an annular groove 99 turned about the inner bore 100 of a third coupling element 101. The third coupling element 101 is a ring-like member having a cylindrical outer diameter 102 and first tooth portion 103 coequally corresponding to the array of teeth 61 on the first coupling element 60, and also having a second tooth portion 104 coequally corresponding to the second array of teeth 68. The first and second portions 103, 104 of teeth are concentric and disposed towards the cooperating arrays of teeth 61, 68 such that the third coupling element 101 may be powered into and out of meshing engagement with the first coupling element 60 and the second coupling element 67. An internal gear 105 is machined within the bore 100 of the third coupling element 101, at its lowermost end. The annular groove 99 provided at the topmost end of the axial bore 100 of the coupling 101, is adapted with a clearance diameter 106 such that when the clamp ring 82 lifts the coupling element 101 by virtue of the balls 96 pressing on the ramp 98 of the annular groove 99, the coupling element 101 may rotate smoothly on the anit-friction balls 96, as the coupling element 101 is rotated. However, when the clamp ring 82 is powered down to enmesh the couplings 60, 67, 101, the balls 96 will fall into the clearance diameter 106 of the annular groove 99 and will not maintain radial jurisdiction of the third coupling element 101, thus permitting it to "center up" on the first and second arrays 61, 68 of teeth. The flange 85 of the clamping ring 82 is provided with an undersurface 107 which is relieved at a portion 108 so that the downward clamping force will be impressed at a desired area on the third coupling element 101.

The prime mover means, which here comprises a motor 14, is mounted to a motor support housing 15 and is located by its pilot diameter 109 in a respective bore 110 in the housing 15. The shaft 111 of the motor 14 carries a driver pulley 112 which is secured by a pin 113 to the shaft 111. The driver pulley 112 is drivingly connected by a power transmission means such as a belt 114, so that rotation of the motor shaft 111 imparts a rotational movement to a driven pulley 115 which is rotatably carried in a bearing set 116 in the base member 12. The bearings 116 are clamped into the base member 12 by a retainer cap 117 in a suitable bore 118, and the bore 119 of the driven pulley 115 contains a keyway 120 and carries the shaft 121 of a worm element 122, and key 123 is fitted within the shaft 121 so that the rotation of the driven pulley 115 is imparted to the worm element 122. A first bore 124 is provided through the base member 12 so that the inboard gear shaft 125 of the worm element 122 may be supported in a bearing package 126 which is slidably maintained in the bore 124.

The gear shaft 125 has a first bevel gear 127 at its innermost end, and as previously stated, a worm element 122 at its mid-section and a shaft 121 of the worm element 122 extending out through the bore 119 of the driven pulley 115. A threaded portion 128 is provided on the outer end of the worm element shaft 121, and a nut 129 which bears against a recess 130 in the driven pulley 115 is provided to pull the worm element 122 against a shoulder ring 131 and bearing set 116 so that the worm element 122 is secured from moving axially with respect to the base member 12. The inner bearing package 126 merely provides radial stability and anti-friction load-carrying capabilities to the bevel gear 127. A second bore 132 is provided transverse to the first bore 124 and the base member 12 in a vertical attitude, concentric with, and adjacent to, a similar bore 133 in the index housing 24. The index housing bore 133 fitted with a clearance diameter 134 and smooth fitting bearing bores 135 at its top and bottom ends. Bearings 136 are carried in these bores 135, and a backup ring 137 is provided to end stop the bottom bearing 136 in its bore 135. A second bevel gear 138 is located with its shaft 139 supported by the bearings 136 in the index housing 24. The bevel gear 138 extends downward into driving engagement with the first bevel gear 127. The topmost end of the bevel gear shaft 139 is fitted with an internal drive pinion 140 and a nut 141 is provided on a threaded portion 142 of the shaft 139 to draw the shaft 139 and pinion 140 against the bearings 136 ad prevent relative axial movement to occur. The pinion 140 is in constant meshing engagement with the internal gear 105 of the third coupling element 101 for imparting rotational movement thereto, while the internal gear 105 may slide axially across the pinion 140. Thus, it can readily be seen that as the motor shaft 111 is actuated, motion will be imparted to; the driven pulley 115; the worm element 122; the first bevel gear 126; and ultimately, the pinion 140 and internal gear 105. An external drive pinion 143 is shown in meshing engagement with the external gear 76 of the second coupling element 67 and the centerline of the pinion 143 is placed at approximately mid-length of the worm element 122. The relationship of the worm element 122 and the pinion 143 will be discussed further when considering the section taken along the line 3—3.

Turning now to FIG. 3, the section through the pinion 143 illustrates that the pinion 143 is supported by an integral shaft 145 and the shaft 145 is supported in a radial direction by a roller bearing 146 mounted in a close-fitting adapter ring 147 which is provided in a companion bore 148 in the index housing 24. The ring 147 extends below the bottom surface 28 of the index housing 24 and extends to provide a pilot for a locating bore 149 in the base member 12. A spacer ring 150 is provided below the roller bearing 146 about the shaft 145, and a worm wheel 151 is carried on the shaft 145 by a smooth fitting bore 152 which bears upon the shaft 145 while a key 153, which is carried in the shaft 145, fits closely within a keyway 154 extending axially through the bore 152 of the worm wheel 151. The worm wheel 151 is backed up by a spacer ring 155 which abuts a bearing set 156 at the bottommost end of the shaft 145, and threads 157 are provided on the bottommost end of the shaft 145 to receive a nut 158 for clamping the shaft 145 (through the elements it carries) to the bearing sets. The bearing set 156 is adapted so that the shaft 145 may rotate relative to the base member 12, while the outer races 156a of the bearings are contained in a bearing retainer 159 having a bore 160 and shoulder 161 provided therein. A retainer cap 162 is provided to clamp the outer races 156a tightly within the bearing retainer 159. The cap 162 is secured to the retainer 159 by screws 163 and the retainer 159 is held in a suitable bore 164 in the base member 12 by screws 165. The worm element 122 is shown in meshing engagement with the worm wheel 151, so that as the worm element 122 is rotated, the worm wheel 151 and corresponding shaft 145 and pinion 143 will likewise be rotated.

The diagramatic perspective drawing shown in FIG. 4 clearly illustrates that when a worm element 122 having a right hand thread is used as shown, together with a placement of the worm wheel 151 on the side indicated; rotational movement imparted from the motor shaft 111 and driving pulley 112 to the driven pulley 115 and its shaft 121, etc., causes the pinions 140, 143 to drive the second coupling element 67 and the third coupling element 101 in the same rotational direction, but at different speeds, according to the radios of gears selected.

FIG. 5a is a plan section taken through the first tooth portion 103 and the second tooth portion 104 of the third coupling element 101 of FIG. 4. For simplification of the diagram, the first tooth portion 103 and the second tooth portion 104 are connected and shown as one solid tooth extending across the face of the third coupling element 101. As previously stated, the number of teeth differ on the first and second tooth portions, thereby resulting in a difference in uniform tooth spacing, and for reference, one first portion tooth and one second portion tooth are shown co-linear with one another and lined up on a reference line X—X. From the reference line X—X, it may be shown that when thenumber of teeth on the second portion 104 exceeds the number of teeth on the first portion 103, as depicted, the angular tooth spacing of the second tooth portion 104 will be smaller than the angular tooth spacing of the first tooth portion 103.

In this case, the angular tooth spacing of the first portion 103 is given the angular designation Beta, and the angular tooth spacing of the second portion 104 is given the angular designation alpha, and the resultant difference in angular tooth spacing is given the designation Theta (which corresponds to Beta minus Alpha). Further, to assist the reader in following the diagrams through successive movements, the co-linear teeth on reference line X—X have been given a new unitary tooth designation, "M". The pinion 140 is shown in mesh with the internal gear 105 of the third coupling element 101. From the diagram, the reader can readily see that working from reference X—X, the distance to the two next successive teeth will be respectively, angle 2XAlpha and angle 2XBeta with a resultant tooth difference of angle 2XTheta, and so on.

Figure 6A:
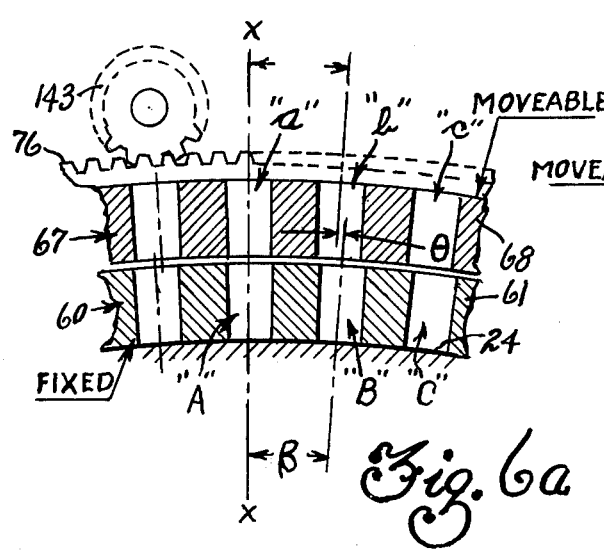
FIG. 6a is a plan section through relatively fixed and movable coupling elements taken along the lines 6—6 of FIG. 4.

Referring to FIG. 6a, the first coupling element 60 is shown fixed to the index housing 24, and the movable second coupling element 67 is shown aligned in such position that a reference tooth space "A" on the first coupling element 60 is shown co-linear with a reference tooth space a, along the reference line X—X of FIG. 5a. As in FIG. 5a, the first coupling element 60 has an array of teeth 61 coequal to the first tooth portion 103 of the third coupling element 101, and the array of teeth 68 on the second coupling element 67 is coequal to the second tooth portion 104 of the third coupling element 101. It therefore follows that the angular tooth spacing from the reference line X—X and its depicted co-linear tooth spaces a, "A", gives an angular tooth space equal to angle alpha on the second coupling element 67 and an angular tooth space of angle beta on the first coupling element 60, and therefore the angular difference between the two next successive tooth spaces, b, "B", is angle Theta, corresponding to angle Beta minus angle Alpha. The difference in angular spacing between the third tooth spaces c and "C", would therefore correspond to the angle 2XBeta, minus the angle 2XAlpha, equal to angle 2XTheta, (and so on), with respect to reference line X—X. The pinion 143 is shown in mesh with the external gear 76 of the second coupling element 67.

Figure 6B:
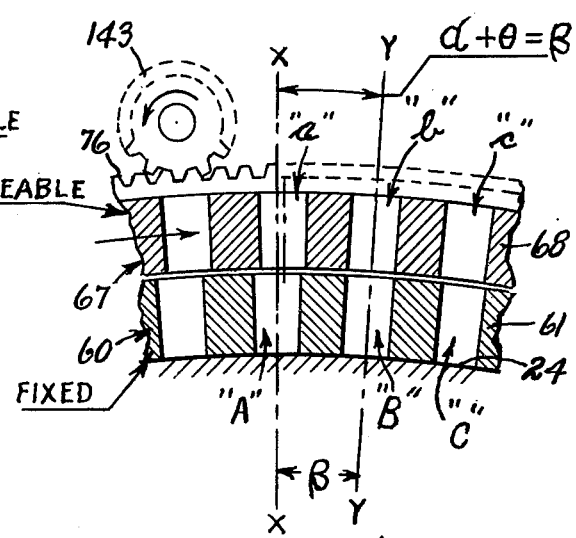
FIG. 6b is a view showing the elements of FIG. 6a immediately after an indexing increment.

FIG. 6b depicts the elements of FIG. 6a immediately after the movable second coupling element 67 has been indexed through an angular increment corresponding to angle Theta. At this new position of the second coupling element 67, it is now seen that tooth spaces b, "B" are now co-linear and the tooth space a has been displaced by an amount equal to angle Theta from its former co-linear position with tooth space "A". Correspondingly, tooth space c has been incremented likewise by an amount corresponding to angle Theta, diminishing the difference between tooth space c and tooth space "C" to an amount equal to: angle 2XTheta minus Theta; or Theta.

Referring to FIG. 5a, it can be seen that the geometrical pattern of the unitary teeth depicted on the third coupling element 101 no longer corresponds to the pattern of teeth shown in FIG. 6b, after index. It therefore is necessary to advance the entire array of unitary teeth shown on FIG. 5a to a new position relative to line X—X where the teeth of the third coupling element 101 can reengage the tooth spaces of the first and second coupling elements 60, 67.

Figure 5B:
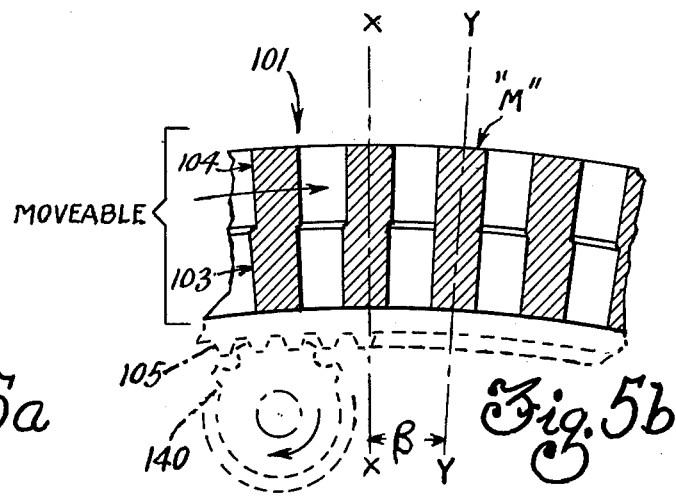
FIG. 5b is a view of the elements of FIG. 5a immediately after an indexing increment.

FIG. 5b shows the position to which the third coupling element 101 must be moved to correspond to the angular increment of Theta through which the second coupling element 67 has been indexed in FIG. 6b. As related in FIG. 6b, the tooth spaces b and "B" now line up along the co-linear line Y—Y drawn through the couplings 60,67 at angle Beta relative to reference line X—X. Therefore, the unitary tooth "M" of the third locking and locating element must be indexed through an angle Beta so that it too can be co-linear with the line Y—Y.

It therefore is seen that the third coupling element 101 moves relative to the second coupling element 67 according to the ratio of angle Beta to angle Theta, and therefore, index movements of the second coupling element 67 made according to a whole multiples of angle Theta will result in simultaneous angular movement of the third coupling element 101 of equal multiples of angle beta.

An example of the fine resolution indexing obtainable with the present invention may be seen when the number of teeth on the first coupling element 60 is chosen at 144T, with an angular tooth spacing corresponding to 360° divided by 144, equal to 2.5°; a number of teeth on the second coupling element 67 equal to 150T, corresponding to an angular tooth spacing of 360° divided by 150, equal to 2.4°; thus, the angular tooth difference between the two couplings is 0.1°. By the equation shown, at discrete index increments of 0.1° movement of the second coupling element 67 relative to the fixed first coupling element, 60, the third coupling element 101 must be indexed through an angle corresponding to 2.5° (the uniform tooth spacing on the first coupling element 60). The ratio of speeds between the second and third coupling elements 67, 101 therefore is 2.5° to 0.1°, or 25 to 1. The 25 to 1 speed ratio can be obtained by selecting gear elements as follows:

a. worm element 122; 2 threads
b. worm wheel 151; 20 teeth
c. external drive pinion 143; 17 teeth
d. external gear 76; 153 teeth
e. bevel gears 127, 128; 24 teeth, respectively f. internal drive pinion 140; 40 teeth g. internal gear 105; 324 teeth It can, be seen therefore with the above parameters, that for a single turn of the worm shaft 122; i.e. one turn (shaft) × 24/24 × 90/324 = 1/3.6 turns of the internal gear 105. Similarly, for one turn of the worm shaft 122; 1 turn (shaft) × 2/20 × 17/153 = 1/90 turns of the external gear 76. Thus, the internal gear 105 rotates 25 times the speed of the external gear 76, and with the parameters shown therefore, when the external gear 76 is moved through an index increment equal to 0.1°, the internal gear 105 must move through a simultaneous increment of 2.5°.

It may be seen that many other combinations of gear proportions may be utilized within the teaching of this invention to obtain desired index increments, and it is the intention of the applicant to not limit his invention to the examples herein stated, but to cover all similar embodiments as well.

What is claimed is:

1. In a mechanism for positioning and securing an indexable machine member against rotation with respect to a base member, said mechanism comprising a first coupling element connected to the base member and including a first annular array of teeth, a second coupling elememt connected to the indexable machine member and including a second annular array of teeth disposed in a concentric relationship with an axis of rotation of the indexable machine member and with said first annular array of teeth, a third coupling element disposed in a concentric relationship with the axis of rotation of the machine member and with said first and second annular arrays of teeth, said third coupling element including tooth means for meshing engagement with at least a portion of said first and second annular arrays of teeth to position and secure the machine member in a selectable predetermined position with the base member, and means for affecting axial movement between said third coupling element and at least one of said annular arrays of teeth to move said tooth means into and out of meshing engagement with at least one of said annular arrays of teeth, and further having means to index said indexable machine member, an improved fine resolution index mechanism comprising:

a. unequal numbers of uniformly spaced teeth on said first and said second arrays of teeth;
   b. first and second tooth portions on said third coupling element wherein said first tooth portion is coequal to said first array of teeth and said second tooth portion is coequal to said second array of teeth; and
   c. means to drive said third coupling element about said axis at a predetermined speed ratio relative to said indexable machine member when said member is indexed, wherein said member and said second coupling element may be indexed to successive angular increments corresponding to the angular difference in respective tooth spaces on said first and second arrays of teeth.

2. The mechanism of claim 1, wherein said means to index said indexable machine member and said means to drive said third coupling element comprise interconnected gear trains powered by a common prime mover means.

* * * * *